United States Patent [19]

Cook

[11] Patent Number: 5,301,340

[45] Date of Patent: Apr. 5, 1994

[54] IC CHIPS INCLUDING ALUS AND IDENTICAL REGISTER FILES WHEREBY A NUMBER OF ALUS DIRECTLY AND CONCURRENTLY WRITE RESULTS TO EVERY REGISTER FILE PER CYCLE

[75] Inventor: Peter W. Cook, Mount Kisco, N.Y.

[73] Assignee: International Business Machines Corporation, Armonk, N.Y.

[21] Appl. No.: 607,176

[22] Filed: Oct. 31, 1990

[51] Int. Cl.$^5$ .............................................. G06F 15/76
[52] U.S. Cl. ................................... 395/800; 395/425; 382/41; 364/923.6; 364/927.8; 364/931.01; 364/931.41; 364/931.47; 364/DIG. 2; 364/232.8; 364/736; 364/243.44
[58] Field of Search ................ 395/800, 425; 364/736; 382/41

[56] References Cited

U.S. PATENT DOCUMENTS

| | | | |
|---|---|---|---|
| 3,815,095 | 6/1974 | Wester | 395/800 |
| 3,889,237 | 6/1975 | Alferness et al. | 395/725 |
| 4,514,807 | 4/1985 | Nogi | 395/800 |
| 4,712,175 | 12/1987 | Torii et al. | 395/800 |
| 4,884,194 | 11/1989 | Krol et al. | 395/575 |
| 4,980,819 | 12/1990 | Cushing et al. | 395/375 |
| 5,008,813 | 4/1991 | Crane et al. | 395/425 |
| 5,057,837 | 10/1991 | Colwell et al. | 341/55 |
| 5,072,373 | 12/1991 | Dann | 395/200 |
| 5,127,097 | 6/1992 | Mizuta | 395/425 |

Primary Examiner—Thomas C. Lee
Assistant Examiner—Paul Harrity
Attorney, Agent, or Firm—Whitham & Marhoefer

[57] ABSTRACT

A parallel computer architecture incorporates a new register file organization for parallel ALUs that provides improved performance due to reduced off-chip crossings and locally higher density. Each ALU is provided with its own, smaller register file located on the ALU chip. Data written by one ALU is "broadcast" to all the "local" register files. This arrangement of "local" register files minimizes the number of pins required and, using very large scale integration (VLSI) techniques, high densities can be achieved. These "local" register files eliminate off-chip delays, and performance is further enhanced by the shorter wire lengths in the local register files.

5 Claims, 3 Drawing Sheets

IC CHIPS INCLUDING ALUS AND IDENTICAL REGISTER FILES WHEREBY A NUMBER OF ALUS DIRECTLY AND CONCURRENTLY WRITE RESULTS TO EVERY REGISTER FILE PER CYCLE

BACKGROUND OF THE INVENTION

1. Field of the Invention

The present invention generally relates to parallel computer architectures and, more particularly, to a Very Long Instruction Word (VLIW) computer architecture having multiple arithmetic logic units (ALUS) with an optimal register file organization within chip boundaries to minimize off-chip crossing delays and to maximize communications between the ALUS.

2. Description of the Prior Art

There is a diversity of parallel computer architectures. Michael J. Flynn in "Very High Speed Computing Systems", *Proceedings of the IEEE*, Vol. 54, 1966, pp. 1901-1909, adopted a taxonomy to classify architectures based on the presence of single or multiple streams of instructions and data. There are generally four categories defined as follows:

SISD (single instruction, single data stream) which defines serial computers.

MISD (multiple instruction, single data stream) which involves multiple processors applying different instructions to a single data stream.

SIMD (single instruction, multiple data streams) which involves multiple processors simultaneously executing the same instruction on different data streams.

MIMD (multiple instruction, multiple data streams) which involves multiple processors autonomously executing diverse instructions on multiple data streams.

Using Flynn's taxonomy, the subject invention is related to architecture that may be loosely described as being MISD. In more detail, the computer architecture relevant to the invention is SISD in the sense that there is a single instruction stream operating on a single stream of data. However, unlike conventional SISD processors, each of the "single" instructions contains multiple operations. For example, a "single" instruction may include eight arithmetic operations, several load/store operations, and a multiple-way branch. The term that is attached to such processors is VLIW for Very Long Instruction Word. A description of a particular version of a VLIW computer architecture is provided by K. Ebcioglu in "Some Design Ideas for a VLIW Architecture for Sequential-Natured Software" published in *Parallel Processing*, M. Cosnard et al., editors, pp. 3-21, North Holland, 1988.

The connection between the VLIW and a conventional sequential machine is the VLIW compiler which, in principle, accepts a program for a sequential machine and re-compiles that program into VLIW instructions, with re-ordering of instructions taking place to keep the multiple operations of the VLIW hardware active while preserving the net effect of the original sequential program. Thus, from the point of view of the original sequential code, the engine is MISD; but from the point of view of the VLIW instructions, it is SISD.

The subject invention implements a VLIW parallel architecture employing register files. In the application of conventional multiport register file techniques to VLIW machines, the large number of ports quickly creates size and performance problems. One approach to the problem was presented by Junien Labrousse and Gerrit A. Slavenburg in their paper entitled "A 50 MHz Microprocessor with a Very Long Instruction Word Architecture" at the 1990 IEEE International Solid-State Circuits Conference, Feb. 14, 1990. Their 32-bit VLIW chip consisted of several independent functional units controlled on a cycle-by-cycle basis by a 200-bit instruction. The functional units include two identical 32-bit ALUS, a 32-bit data memory interface, a register file, a constant-generation unit and a branch unit. All units are connected to a shared on-chip multiport memory from which the ALUs take operands and into which results are written. Any previously computed result can be used as an operand by either ALU.

In order to gain the necessary bandwidth, the multiport memory of the Labrousse et al. VLIW architecture required a special design with each operand of each functional unit having a local storage unit called a funnel file. All functional units and funnel files are located on both sides of a crossbar switch. The register file is considered as but one of the functional units and, therefore, access to the register file by the ALUs is through the multiport memory.

SUMMARY OF THE INVENTION

It is therefore an object of the present invention to provide a new register file organization for parallel ALUs which provides improved performance due to reduced off-chip crossings and locally higher density.

According to the invention, each ALU is provided with its own, smaller register file which can be located on the ALU chip. In the example given of four parallel ALUS, the on-chip register files have two read ports and four write ports. Data written by one ALU is "broadcast" to all four register files. This arrangement of "local" register files minimizes the number of pins required and, using very large scale integration (VLSI) techniques, high densities can be achieved. These "local" register files eliminate off-chip delays, and performance is further enhanced by the shorter wire lengths in the local register files.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
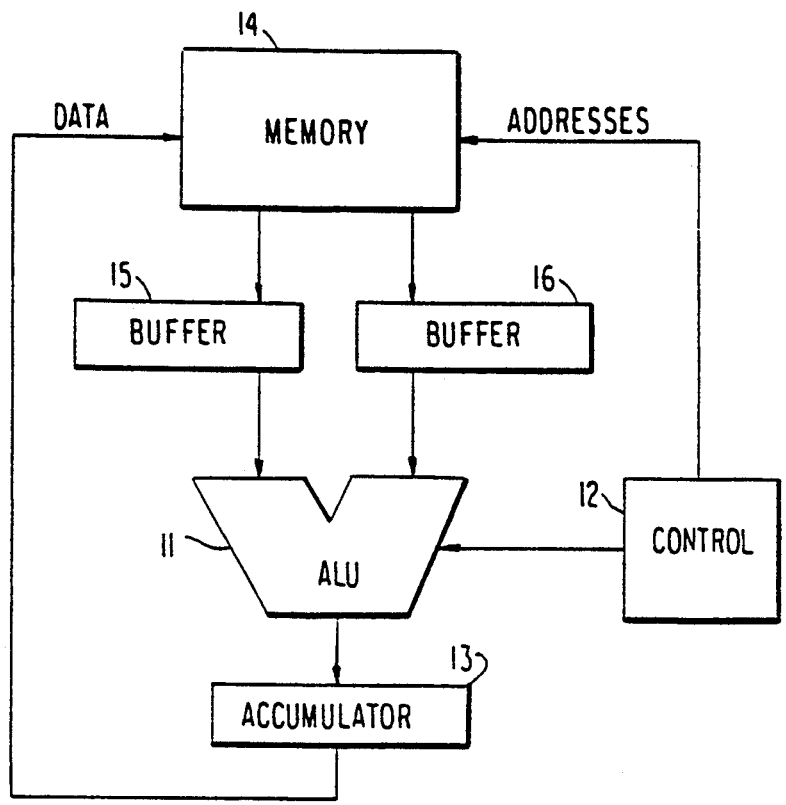
FIG. 1 is a block diagram of a typical programmed digital computer architecture.

In the field of digital computers, an early standard programmed machine is generally illustrated in FIG. 1 as comprising an Arithmetic Logical Unit 11 which receives two operands and performs an arithmetic or logical operation on the two operands, as determined by the control unit 12, and stores the result in an accumulator 13. Initially, the two operands are read from memory 14 to respective buffers 15 and 16. The contents of the accumulator 13, in turn, may be stored in memory 14; however, since the result stored in the accumulator 13 is often used for the next sequential operation in a series of program steps, the contents of the accumulator 13 may be input to the ALU 11 as one of the operands. This is accomplished by switch 16 under the control of control unit 12.

Figure 2:
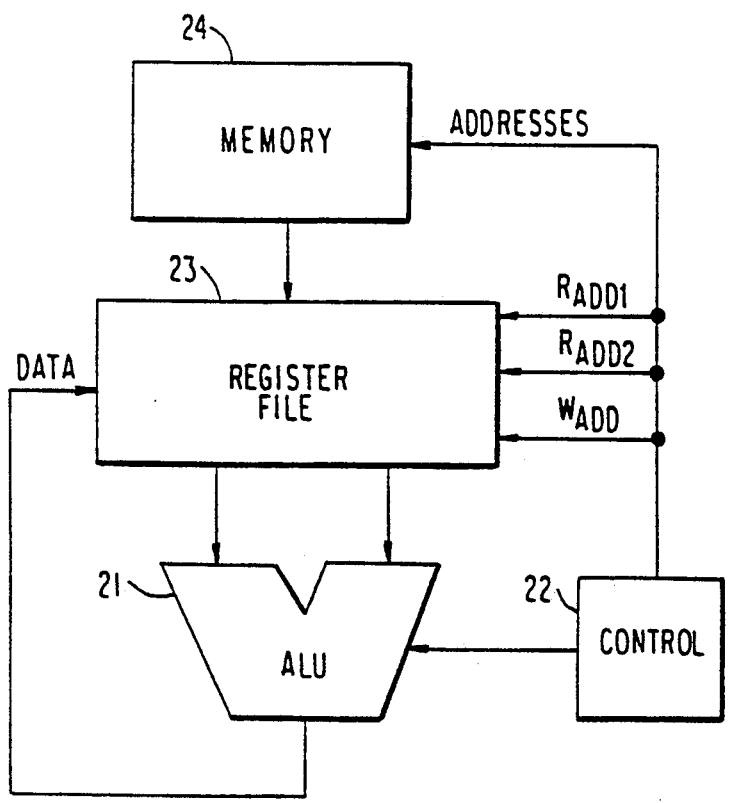
FIG. 2 is a block diagram showing a prior art computer architecture incorporating a register file.

The architecture of the IBM System 360, introduced in 1964, improved on the basic design of system shown in FIG. 1 by introducing register files. This architecture is generally shown in FIG. 2 and comprises an ALU 21 performing arithmetic and logical operations under the control of a control unit 22. A large register file 23 between the ALU 21 and the memory 24 replaced the accumulator 13 and, optionally, operand buffers 15 and 16. A series of operands could now be stored in this register file greatly enhancing the speed of the system by minimizing the delays of memory fetches. Data in the register file 23 is read out in response to read addresses $R_{ADD1}$ and $R_{ADD2}$ from the control unit 22. The result data from the ALU 21 is written to the register file 23 in response to a write address $W_{ADD}$, also from the control unit 22.

The foregoing is by way of introduction and, while quite general, is intended to illustrate what is meant by a "register file" in the context of the present invention. The register file 23 is not "memory" in the sense that term is generally used in the data processing arts. In the complete hierarchy of memory architecture, the register file 23 is at the "highest" level of the hierarchy; i.e., closer to the ALU 21 than cache. The memory 24 as shown in FIG. 2 includes cache, Random Access Memory (RAM) and Direct Access Storage Devices (DASDs).

Figure 3:
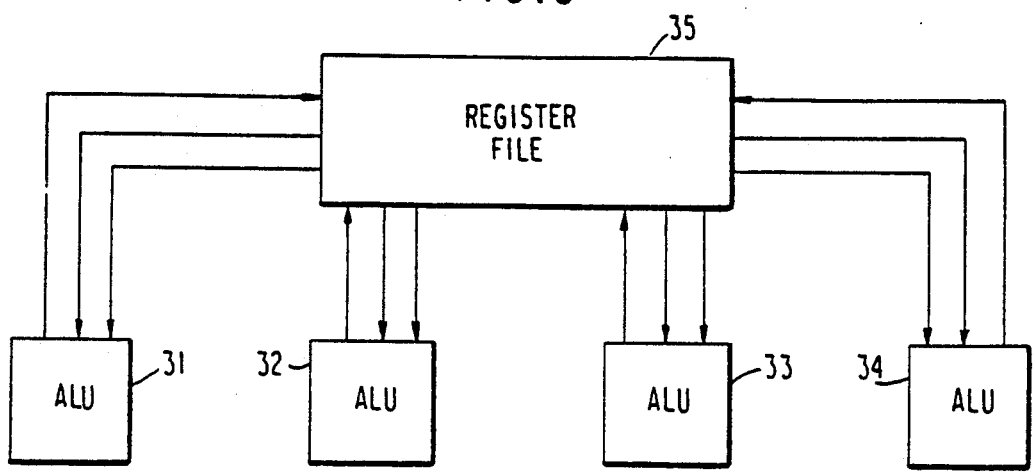
FIG. 3 is a block diagram of a VLIW parallel computer architecture with a shared multi-port register file.

The present invention is a register file for a VLIW parallel computer architecture wherein a plurality of ALU chips are connected to a register file, which may be on a separate chip. An example of this architecture is shown in FIG. 3 in which four ALUs 31, 32, 33, and 34 are connected to a register file 35. Each of these devices are implemented in a single integrated circuit (IC) chip. In contrast to MIMD in which memory is shared by multiple processors through an interconnection mechanism, such as a cross-bar switch or the like, the VLIW shares registers and has no explicit interconnect mechanism. The register files accept write data from all active processes (ALUS) in the engine. Thus, in the register file structure, there is no explicit switching in any traditional sense. A given register can always be written by any ALU. All that is needed is that the ALU actually be instructed to perform a write operation. Since the write operation is never to one but to all the register files, problems of coherency never arise.

In the architecture shown in FIG. 3, three register file operations require $3\times 4=12$ ports. However, this structure is not efficient for two reasons. First, there are a plurality of chip crossings for the register operations. Second, the register file 35 requires many pins (e.g., for 64 words of 32 bits, more than 900 pins are required) and is not dense, owing to the fact that chip area is roughly a function of the square of the number of pins (or ports).

Figure 4:
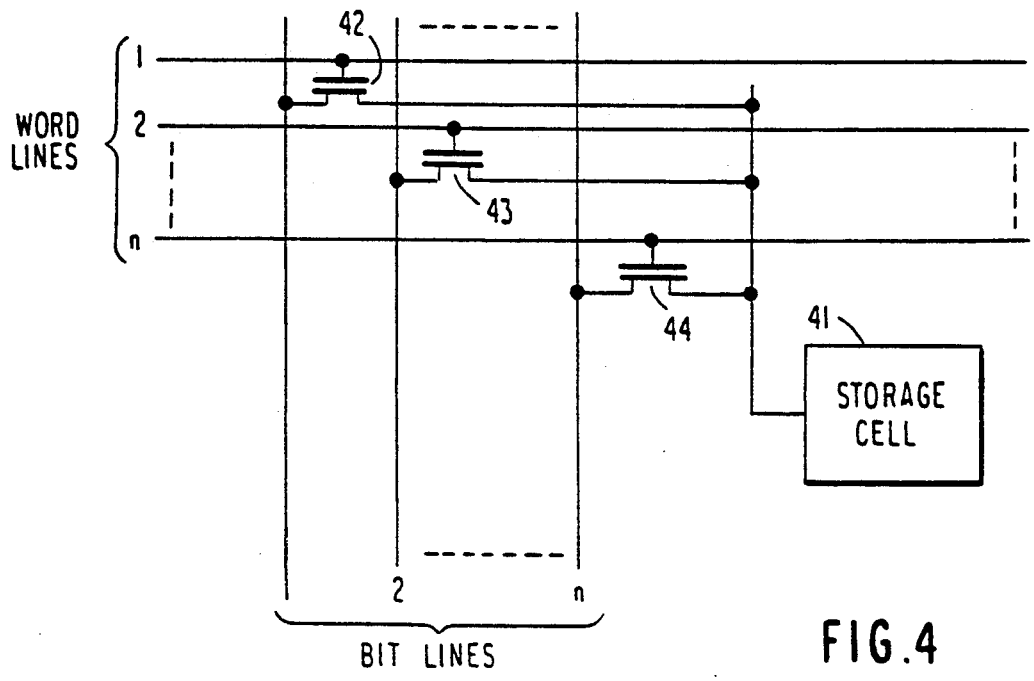
FIG. 4 is a schematic diagram showing one storage cell in the register file of FIG. 3 to illustrate the problems encountered in a straightforward approach to the design of the register file.

FIG. 4 shows a generic register file structure. It includes a storage cell 41 accessed via Field Effect Transistor (FET) switches 42, 43 and 44 by a plurality of bit lines and a plurality of word lines. Each port requires its own "word" line and its own "bit" line (or lines). This leads to a cell whose edge grows linearly with the number of ports, $n_p$, and whose area grows as a function of $n_p^2$. The linear growth in cell edge implies longer lines, greater capacitance and reduced performance. In addition, the possibility of multiple reads from a single location raises issues of cell stability which can be addressed by providing separate devices within the cell for gating data, again at the cost of reduced performance.

While these problems can be addressed by time multiplexing a very fast conventional file structure, this leads to complications to properly order such multiplexed operations, i.e., all writes must precede all reads, and further complexity results if multiple writes to a single register are allowed. Even in the special funnel files of the multiport memory design of the Labrousse et al. VLIW architecture described above, a multiplexer in the write port is required.

In this invention, these problems are addressed by subdividing the register file into multiple copies of a basic unit. While this unit is multiported, the number of ports is greatly reduced over a conventional design. Thus, a typical unit for the VLIW architecture will have $n_a$ write ports, where $n_a$ is the number of ALUS, and two read ports. The $n_a$ write ports allows simultaneous writes into all copies, thereby maintaining identical data in all copies. The two read ports provide left and right operands for one ALU. In an integrated circuit implementation, this allows an ALU and a register file to co-exist on a single chip and thus allows "register-to-register" operations to take place with a single off-chip crossing, that being the "broadcast" of written data from one ALU to another ALU's register file copy.

Figure 5:
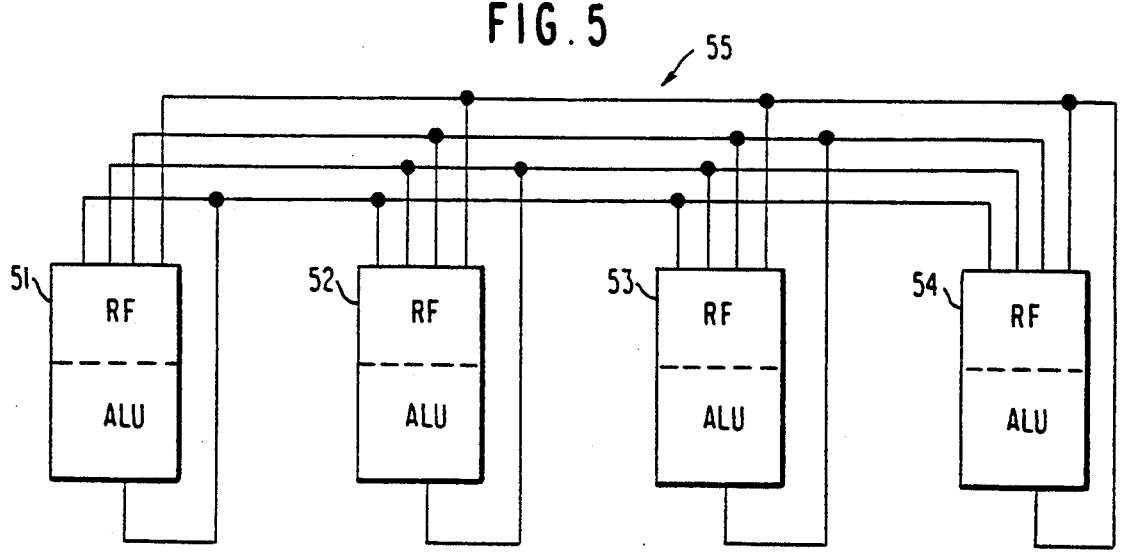
FIG. 5 is a block diagram of the parallel computer architecture according to the present invention employing local register files.

FIG. 5 shows the improved computer architecture according to the invention. Again, the example shown is for four parallel ALUS, although it will be understood that the principles of the invention can be applied to some other multiple, such as eight, twelve or sixteen ALUS. In FIG. 5, there are four chips, 51, 52, 53, and 54, each comprising a ALU and a local register file (RF). In this example, each register file has two on-chip read ports and four off-chip write ports. Data written by any of the ALUs is "broadcast" via bus 55 to all four register files.

Each register file has only six ports and is two to four times smaller than a single twelve port register file, such as register file 35 shown in FIG. 3. By reducing the number of ports per register file, internal capacitances are kept relatively low in the register files, thereby enhancing performance. Off-chip crossing delays are minimized, and the shared write ports of the register files ensure that, on a given cycle, any ALU has access to the result obtained at any ALU in the previous cycle.

Figure 6:
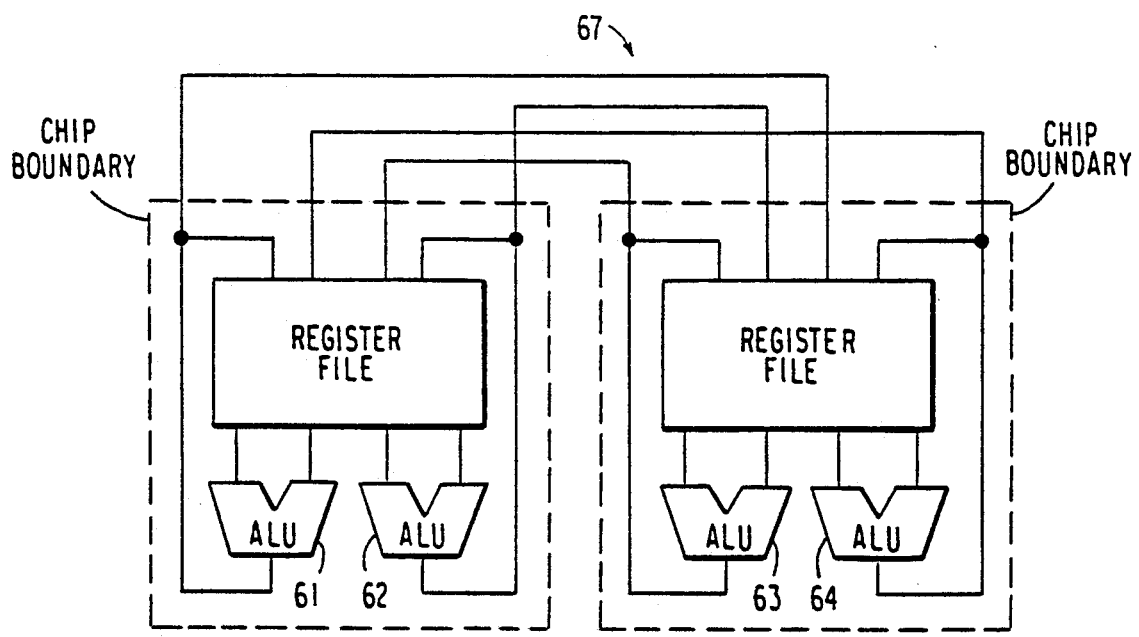
FIG. 6 is a block diagram showing a modification of the parallel computer architecture shown in FIG. 5.

Minor variations are possible and may be desirable depending upon technology details. Thus, a single register file copy may be provided with four read ports to allow it to communicate with two independent ALUs as shown in FIG. 6. This is an advantageous arrangement if the technology will sustain two ALUs on a single chip. Note that this example also contemplates a total of four ALUs 61, 62, 63, and 64, implemented on two chips, each with a single register file 65 and 66 interconnected by a broadcast bus 67, but it will be understood that a greater number of ALUs may be used in a specific VLIW architecture.

While the invention has been described in terms of a single preferred embodiment, those skilled in the art will recognize that the invention can be practiced with modification within the spirit and scope of the appended claims.

What is claimed is:

1. A Very Long Instruction Word (VLIW) computer architecture comprising:

at least three integrated circuit chips, each of said chips including an arithmetic logic unit and a local register file, said local register file having a plurality of on-chip read ports connected to the arithmetic logic unit for supplying two operands to said arithmetic logic unit, and said local register file having a plurality of write ports equal in number to a total number of all said arithmetic logic units of all said integrated circuit chips of said VLIW computer architecture, whereby said local register file is partitioned into a plurality of sections, each said section corresponding to one of said write ports; and a broadcast bus directly interconnecting each of said arithmetic logic units with a corresponding one of the write ports of each of said local register files, each said arithmetic logic unit when performing a write operation writing to a corresponding one of said sections of all of said local register files via said broadcast bus such that, on a given cycle, a plurality of said arithmetic logic units concurrently write results to all said local register files and any said arithmetic logic unit has access in a next cycle to said results obtained at every said arithmetic logic unit in said given cycle.

2. The architecture as recited in claim 1 wherein each of said chips includes a single arithmetic logic unit and a single local register file.

3. The architecture as recited in claim 1 wherein each of said chips includes a plurality of arithmetic logic units and a local register file.

4. The architecture as recited in claim 2 comprising four integrated circuit chips, each of said chips including a single arithmetic logic unit and a single local register file.

5. In a Very Long Instruction Word (VLIW) computer architecture having at least three integrated circuit chips, each of said chips including an arithmetic logic unit (ALU) and a local register file, said local register file having a plurality of on-chip read ports connected to the ALU for supplying two operands to said ALU, a method of optimizing the local register file organization to maximize communications between the ALUs comprising the steps of:

providing in each said local register file a plurality of write ports equal in number to a total number of all said ALUs of all said integrated circuit chips of said VLIW computer architecture, whereby said local register file is partitioned into a plurality of sections, each said section corresponding to one of said write ports; an directly interconnecting each of said ALUs with a corresponding one of the write ports of each of said local register files by means of a broadcast bus, each said ALU when performing a write operation writing to a corresponding one of said sections of all of said local register files via said broadcast bus such that, on a given cycle, a plurality of said ALUs concurrently write results to all said local register files and any said ALU has access in a next cycle to said results obtained at every said ALU in said given cycle.

* * * * *